G. FETTER.
Sewing Machine.
No. 1,704.
Reissued June 21, 1864.
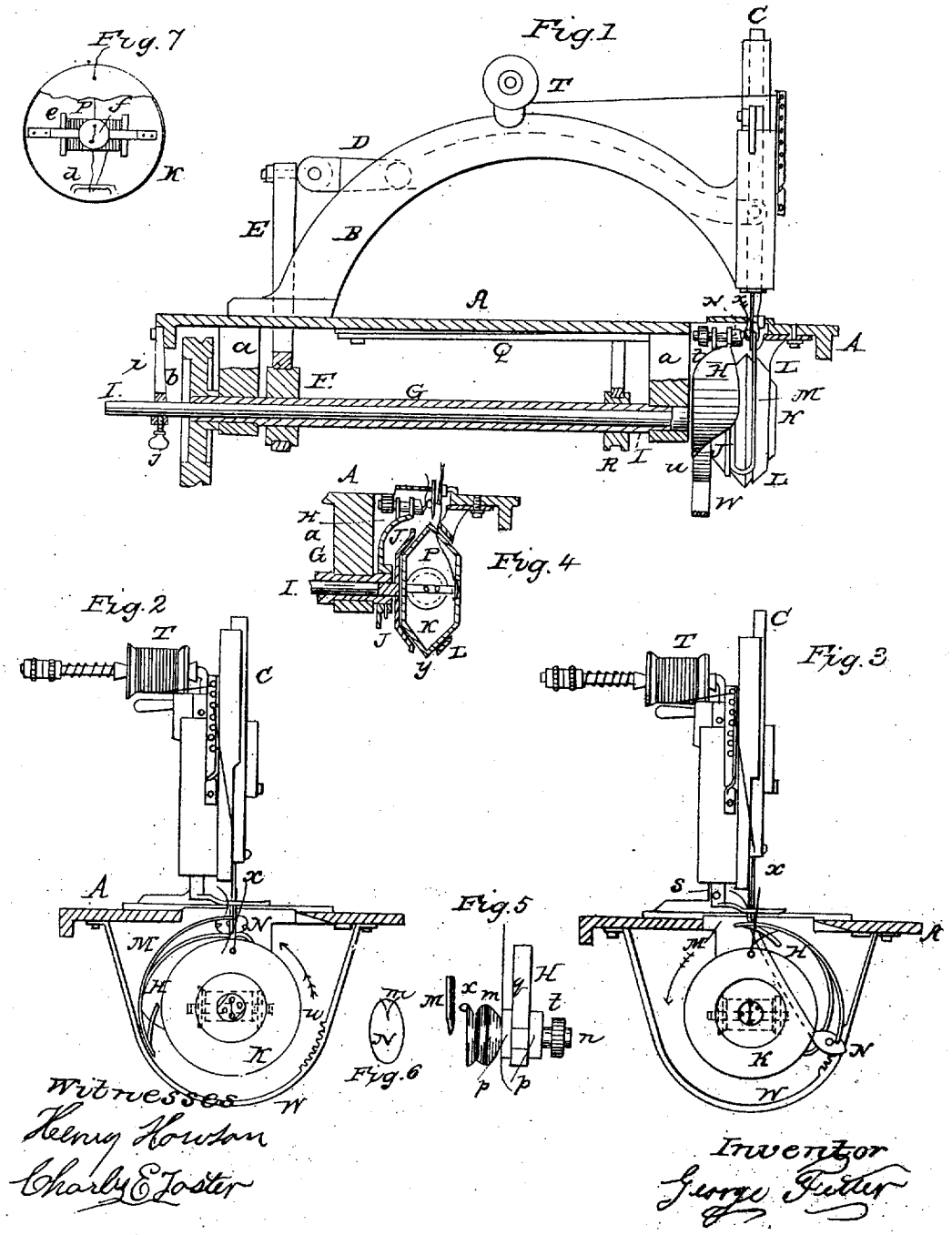
N. PETERS, Photo-Lithographer, Washington, D. C.

UNITED STATES PATENT OFFICE.

S. PANCOAST, OF PHILADELPHIA, PA., ASSIGNEE OF GEORGE FETTER.

IMPROVEMENT IN SEWING-MACHINES.

Specification forming part of Letters Patent No. 30,518, dated October 23, 1860; Reissue No. 1,704, dated June 21, 1864.

*To all whom it may concern:*

Be it known that I, S. PANCOAST, of Philadelphia, Pennsylvania, did, as assignee of GEORGE FETTER, obtain Letters Patent of the United States, dated October 3, 1860, for Improvements in Sewing-Machines, which Letters Patent I now deem inoperative and invalid by reason of a defective specification; and I do hereby declare the following to be a full, clear, and exact description of the invention of the said GEORGE FETTER, reference being had to the accompanying drawings, and to the letters of reference marked thereon.

The said invention consists, first, of a hook or loop-catcher formed substantially as described hereinafter, and illustrated in the drawings, the said hook being arranged to revolve around or adjacent to a spool-case, and being so arranged in respect to an eye-pointed needle, and having such a motion imparted to it, independent of its revolving motion, that it will seize the needle-thread, carry the same around or partly around a spool-case and release the said loop of thread, all substantially as set forth; secondly, in a certain guard so constructed, so arranged, and so operating on the thread which passes from the spool-case to the fabric that the said thread cannot be caught by the aforesaid revolving hook; thirdly, in a certain combination of a spindle with a disk, a hollow spindle and carrier, and a spool-case, all of which are fully described hereinafter.

In order to enable others skilled in the art to make and use the said invention, I will now proceed to describe its construction and operation.

On reference to the accompanying drawings, which forms a part of this specification, Figure 1 is a side view, partly in section, of the improved sewing-machine; Figs. 2 and 3, front views illustrating the improvements in different positions; Fig. 4, a detached sectional view of the improvements; Fig. 5, an end view of the hook, showing its position as regards the needle and guard, and drawn to an enlarged scale; Fig. 6, a face view of the revolving hook, and Fig. 7 a view showing the interior of the shuttle.

Similar letters refer to similar parts throughout the several views.

A is the base-plate of the machine, to which is secured the stationary arm B, having at its outer end a vertical guide, in which slides the needle-bar C, the latter being furnished with the usual eye-pointed needle, *x*, and the bar being connected to the needle-lever D, which has its fulcrum on a pin secured to the stationary arm B. The end of the short arm of the needle-lever D is jointed to the upper end of the vertical rod E, the lower end of the latter being arranged to embrace the eccentric F on the hollow spindle G, which turns in projections *a a* on the under side of the base-plate A. One end of this hollow spindle is furnished with the usual grooved driving-pulley, *b*, and the opposite end with a carrier, H, which will be more especially alluded to hereinafter.

Through the hollow spindle G passes a shaft, I, which is held stationary by a bracket, *i*, and a set-screw, *j*, at the rear end of the machine. The end of the shaft I is furnished with a cup-shaped disk, J, adapted to receive the spool-case or discoidal shuttle K, the form of which will be best observed on reference to Fig. 4, and the construction of which will be fully explained hereinafter.

The spool-case is held in its proper position by an annular cap, L, secured to the under side of the base-plate A, the distance between the cap and the disk J being somewhat greater than the width of the spool-case, in order to allow the loop of needle-thread to pass freely round the latter.

It will be observed that the carrier H, previously alluded to as being connected to the end of the hollow spindle G, is situated immediately behind the stationary disk J, and that it has a curved guard, M, and a hook, N. This guard M consists of a wire or strip of metal so bent, of such a length, and so situated that as it revolves it will push forward the thread which passes from the shuttle to the fabric, and maintain that thread at a distance from the range of the hook N, as more fully explained hereinafter, the said hook having a sharp point, *m*, for catching hold of the needle-thread, and a groove for retaining a hold of the loop, as best observed on reference to the views Figs. 5 and 6.

The stem *n* of the hook passes through and turns in the two projections, *p p*, of the carrier H, a spring, *q*, secured to the carrier bearing against the under side of the said stem, and the latter being made flat, so as to receive the spring, which has thus a tendency to retain the hook in a position ready for its point *m* to seize the needle-thread, as seen in Fig. 5. The stem *n* is furnished with a pinion, *t*, arranged to gear into the teeth *u* on the bent bar W, which is secured to the under side of the base-plate A.

The spool-case consists of two hollow disks meeting each other at the point *y*, Fig. 4, and inclosing a space large enough to admit an ordinary spool, P, of sewing-thread. This spool is hung to a yoke, *e*, secured to the inside of the rear half of the spool-case, as seen in Fig. 7, a small disk, *f*, being secured to the top of the yoke and passing through an opening in the front half of the case, the disk being so formed in respect to the said opening that on turning the front half of the case partially round it may be withdrawn from its hold of the disk. The thread passes from the spool P downward and round a bar, *d*, secured to the rear half of the spool-case, upward through a hole in the disk *f*, through another hole in the same disk, and finally through a hole in the front half, and near the upper edge of the spool-case, to the fabric, so that a proper degree of tension may be imparted to the thread.

Q is the feed-lever, hung to the under side of the base-plate, and furnished at the end with a serrated projection, passing through the said base-plate at a point near the hole for the passage of the needle *x*, a vibrating motion being imparted to the lever by means of an eccentric, R, on the hollow spindle G.

As the feeding device forms no part of these improvements, a further explanation of it will be unnecessary.

The machine is furnished with the usual spring pressure-pad, S, and with the usual device for carrying the spool T of needle-thread. As the hollow spindle G is caused to revolve on the stationary spindle I the following movements will take place, namely: the necessary reciprocating motion of the needle *x*, the continuous rotary motion of the carrier H, its guard M, and hook N, and the intermittent rotary movement of the said hook N on its own axis.

Let us suppose the above-mentioned parts to be in the position illustrated in Fig. 2, the needle being depressed to its lowest point, and the point *m* of the hook having seized the loop of needle-thread. As the carrier H, with its hook and guard, moves in the direction of the arrow, the hook, still retaining its hold of the oop, will stretch the latter and carry it partly round the spool-case until it arrives at the position shown in Fig. 3, when, the pinion *t* on the stem of the hook being brought into gear with the teeth *u* of the bar W, the hook will quickly turn partly round on its own axis and release the loop. The moment the teeth of the pinion *t*, however, escape from the teeth *u* on the bar W the hook will instantly recover its former position, owing to the spring *q* bearing against the flat side of the stem *n*, as before described, so that the moment one loop is released the point *m* of the hook is in a proper position for again seizing the needle-thread. As the hook N was about to turn on its own axis, however, and release the loop, the guard M, bearing against the inside of the lower spool-thread, which passes between the spool-case and the fabric, had pushed the said thread forward, and the threads are held in this position by the guard until the hook again seizes the needle-thread, preparatory to forming another loop of the same, and carries it round the spool-case, as before. It will thus be seen that the guard M serves the purpose of preventing the thread which passes from the spool-case to the fabric from being seized by the point *m* of the hook.

The method in which the ordinary interlocked stitch is formed by the above-described devices and movements will be fully understood by those familiar with sewing-machines.

I claim as the invention of the aforesaid GEORGE FETTER—

1. The hook or loop-catcher N, formed substantially as described and illustrated, the said hook being arranged to revolve around or adjacent to a spool-case, and being so situated in respect to the eye-pointed needle, and having such a motion imparted to it in connection with its revolving motion, that it will seize the needle-thread, carry the same around or partly around a spool-case, and release the said loop of thread, all substantially as set forth.

2. The guard M or its equivalent, constructed, arranged, and operating on the thread which passes from the spool-case to the fabric, substantially as set forth.

3. The stationary spindle I, with its disk J, the hollow spindle G, and carrier H, the annular cap L, and spool-case K, the whole being arranged and operating substantially as set forth.

In testimony whereof I have signed my name to this specification before two subscribing witnesses.

S. PANCOAST.

Witnesses:
HENRY HOWSON,
C. E. FOSTER.